(12) United States Patent
Kettavong et al.

(10) Patent No.: US 12,303,072 B2
(45) Date of Patent: May 20, 2025

(54) CENTERING PAD AND REMOVABLE ENCLOSURE FOR A BLENDER

(71) Applicant: Vita-Mix Management Corporation, Olmsted Township, OH (US)

(72) Inventors: Phonesacksith Guy Kettavong, Medina, OH (US); Alan Pilch, Olmsted Township, OH (US); David Kanning, Valley City, OH (US); Matthew John Dugan, Medina, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 201 days.

(21) Appl. No.: 17/471,588

(22) Filed: Sep. 10, 2021

(65) Prior Publication Data

US 2022/0015578 A1    Jan. 20, 2022

Related U.S. Application Data

(63) Continuation of application No. 16/818,383, filed on Mar. 13, 2020, now Pat. No. 11,426,032, which is a continuation-in-part of application No. 15/799,317, filed on Oct. 31, 2017, now abandoned.

(60) Provisional application No. 62/817,636, filed on Mar. 13, 2019, provisional application No. 62/415,043, filed on Oct. 31, 2016.

(51) Int. Cl.
    *A47J 43/07*  (2006.01)

(52) U.S. Cl.
    CPC ....... *A47J 43/0761* (2013.01); *A47J 43/0716* (2013.01)

(58) Field of Classification Search
    CPC .................... A47J 43/0761; A47J 43/0716
    See application file for complete search history.

(56) References Cited

U.S. PATENT DOCUMENTS

| | | |
|---|---|---|
| 2,372,862 A | 4/1945 | Strauss |
| 3,175,594 A | 3/1965 | Jepson |
| D237,503 S | 11/1975 | Langmack |
| 3,961,721 A | 6/1976 | Gordon |
| D249,870 S | 10/1978 | Tillander |
| D295,012 S | 4/1988 | Gelber |
| 4,822,175 A | 4/1989 | Barnard |
| D301,824 S | 6/1989 | Machuron |
| 4,883,144 A | 11/1989 | Haushalter |
| D321,647 S | 11/1991 | Oldorf |
| 5,533,797 A | 7/1996 | Gelber |
| 5,696,358 A | 12/1997 | Pfordresher |

(Continued)

OTHER PUBLICATIONS

International Searching Authority, European Office, International Preliminary Report on Patentability, PCT/US2009/004635, mailed Feb. 24, 2011.

(Continued)

*Primary Examiner* — Elizabeth Insler
(74) *Attorney, Agent, or Firm* — Dinsmore & Shohl LLP

(57) ABSTRACT

The present system provides an enclosure which engages a blender base via friction fit created by one or more engagement members, so that a rotation of the enclosure and blender base relative to one another secures the enclosure to the blender base with an audible or tactile confirmation. A centering pad is attached to the system. The centering pad prevents the enclosure from rotating and becoming unlocked from the blender base due to operation of a motor.

18 Claims, 18 Drawing Sheets

(56) References Cited

U.S. PATENT DOCUMENTS

| | | | |
|---|---|---|---|
| D406,154 S | 2/1999 | Copland | |
| 5,957,577 A | 9/1999 | Dickson | |
| 6,059,445 A | 5/2000 | St John | |
| D426,423 S | 6/2000 | Lee | |
| D427,016 S | 6/2000 | Kindig | |
| D428,564 S | 7/2000 | Kao | |
| D432,864 S | 10/2000 | Kindig | |
| D466,761 S | 12/2002 | Baerenrodt | |
| D471,059 S | 3/2003 | Chuang | |
| 6,571,908 B2 | 6/2003 | Bohannon | |
| D526,845 S | 8/2006 | Katz | |
| D528,364 S | 9/2006 | Kolar | |
| 7,600,706 B2* | 10/2009 | Huang | A47J 43/0777 241/37.5 |
| 8,042,990 B2* | 10/2011 | Pryor, Jr. | A47J 43/0766 366/601 |
| 8,226,021 B2 | 7/2012 | Wilson | |
| 8,287,180 B2 | 10/2012 | Kolar | |
| RE45,308 E | 12/2014 | Kolar | |
| RE45,655 E | 8/2015 | Kolar | |
| 2003/0034200 A1 | 2/2003 | Bohannon | |
| 2003/0042805 A1 | 3/2003 | Bates | |
| 2005/0152215 A1* | 7/2005 | Stuart | A47J 43/0716 366/205 |
| 2012/0027902 A1* | 2/2012 | Audette | A47J 43/046 366/205 |
| 2014/0217211 A1* | 8/2014 | Sanford | A47J 43/0761 241/37.5 |
| 2018/0014696 A1* | 1/2018 | Williams | A47J 43/085 |
| 2018/0116466 A1* | 5/2018 | Pilch | A47J 43/0761 |

OTHER PUBLICATIONS

International Searching Authority, European Office, International Search Report and the Written Opinion, PCT/US2009/004635, mailed Oct. 26, 2009.

International Searching Authority, European Office, International Preliminary Report on Patentability for PCT/US2009/003745 dated Feb. 3, 2011.

International Searching Authority, European Office, International Search Report and the Written Opinion for PCT/US2009/003745 dated Jul. 21, 2008.

Summit Operation Manual—Hamilton Beach (Nov. 2007—pp. 1, 4, 6, 7, 8).

Blendtec Operations Manual—Blendtec (Apr. 2006—15 sheets).

Xtreme—Waring (2006—2 pages).

Q Series—Blendtec (May 2006—2 pages).

* cited by examiner

CENTERING PAD AND REMOVABLE ENCLOSURE FOR A BLENDER

CROSS-REFERENCE TO RELATED APPLICATIONS

This application is a continuation of U.S. patent application Ser. No. 16/818,383, filed on Mar. 13, 2020, entitled "CENTERING PAD AND REMOVABLE ENCLOSURE FOR A BLENDER," which claims priority to U.S. Provisional Patent Application No. 62/817,636 filed on Mar. 13, 2019, entitled "CENTERING PAD AND REMOVABLE ENCLOSURE FOR A BLENDER," and claims priority to, and is a continuation-in-part of, U.S. patent application Ser. No. 15/799,317 filed on Oct. 31, 2017, entitled "REMOVABLE ENCLOSURE FOR A BLENDER," which claims priority to U.S. Provisional Patent Application No. 62/415,043 filed on Oct. 31, 2016, entitled "REMOVABLE ENCLOSURE FOR A BLENDER," each of which is incorporated herein by reference in its entirety.

TECHNICAL FIELD

The present invention relates generally to an enclosure for a blender and, more specifically, to a centering pad and removable enclosure fitted onto a blender in a twistable, locking fashion to reduce noise and provide an added layer of security when the machine is in operation.

BACKGROUND

Many electrically powered food processors, also referred to as blenders, create considerable noise when in operation. Owing to the considerable number of high speed, moving parts, mechanisms must also be employed to ensure the safe and secure operation of such machines. For example, blenders commonly employ a base containing an electric motor and its attendant controls. A container is then fitted onto this base so as to engage the drive shaft associated with the motor in order to propel one or more blades associated with the container to chop, mix, puree, or otherwise blend foodstuffs placed within the container.

A variety of enclosures fitting over or integral with the blending container have been developed, with an eye toward improving the overall operation and experience in using a blender. For example, U.S. Design Pat. D427,016 discloses one such ornamental enclosure. U.S. Pat. No. RE45,655 discloses an enclosure designed to reduce the noise level of the blender by providing a hinged enclosure affording access to the container while remaining seated around the periphery of the base. Both of the patents are incorporated by reference as if fully rewritten herein.

Other approaches include hinged boxes which fully encase both the base unit and enclosure. In comparison to the patented designs noted above, these devices tend to be bulky and cumbersome. Furthermore, these units may prevent the user from accessing controls and buttons located on the base unit itself.

In view of the foregoing, further improvements could be made with respect to reducing noise through the use of blender enclosures. In the same manner, an enclosure that integrates with the base unit in a manner which further enhances the user's overall experience would be welcome.

SUMMARY

A blender assembly may comprise a blender base comprising a motor, a pedestal extending from the blender base, an enclosure operatively attached to the blender base, and a centering pad operatively positioned to contact the pedestal and the enclosure when the enclosure is operatively attached to the blender base, wherein at least a portion of the centering pad is disposed between at least one groove defined by the pedestal and the enclosure. In an embodiment, the enclosure may comprise a body portion and a base wherein the base portion is configured to engage the pedestal and wherein the enclosure is pivotal between a locked and unlocked position to selectively secure the enclosure to the pedestal. The base portion of the enclosure may comprise an aperture that defines an opening to receive the pedestal, and wherein the at least one groove is defined between the opening and the pedestal. The portion of the centering pad may comprise at least one flange extending from a body of the centering pad, wherein the at least one flange is operatively disposed within the at least one groove. The centering pad may comprise at least one protrusion extending from the body portion in a direction opposed to the at least one flange. The at least one flange may comprise an elastomeric material that operatively biases the enclosure to a locked position. The centering pad may comprise a body and at least one wall extending from the body, wherein the at least one wall operatively directs the flow of material. The at least one wall may operatively direct the flow of material away from the at least one groove. The enclosure may comprise a body portion, a base portion, and a cover portion, and wherein the at least one wall operatively directs the flow of material away from the body portion. The centering pad may comprise an elastomeric material.

Also disclosed herein is a centering pad for a blender assembly, the centering pad comprising a body comprising a first side and a second side, at least one flange extending from the second side, at least one protrusion extending from the first side, and at least one wall extending from the first side about at least a portion of a peripheral edge of the first side, wherein the at least one wall operatively directs the flow of material. The body may comprise an aperture that operatively receives a blade assembly. The centering pad may comprise a foot portion extending from the body. The protrusion on the centering pad may further comprise a recess that opens onto the second side of the centering pad. The recess may operatively engage with a pedestal and the protrusion may operatively engage with a container. The centering pad may comprise at least one of a magnet, a chemical adhesive, or a fastener operatively attachable with the body.

Described herein is blender assembly comprising a blender base comprising a housing that houses a motor, a pedestal disposed on the housing, and a centering pad operatively positioned on at least a portion of the pedestal, wherein the centering pad comprises at least one projection extending away from the blender base, and wherein the at least one projection comprises a locking member that operatively locks a first container to the pedestal. The first container may comprise a food processing bowl. The food processing bowl is moved between a locked orientation and to an unlocked orientation by rotating the food processing bowl about an axis. The blender assembly may comprise a second container comprising an apron and a body, wherein the second container is positioned on the centering pad such that the at least one protrusions are disposed within the apron to prevent the second container from rotating.

Specific reference is made to the appended claims, drawings, and description below, all of which disclose elements of the invention, as well as any of the commonly assigned patents, patent publications, and patent application serial numbers identified herein. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the invention may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein.

In the drawings.

DETAILED DESCRIPTION

Figure 1A:
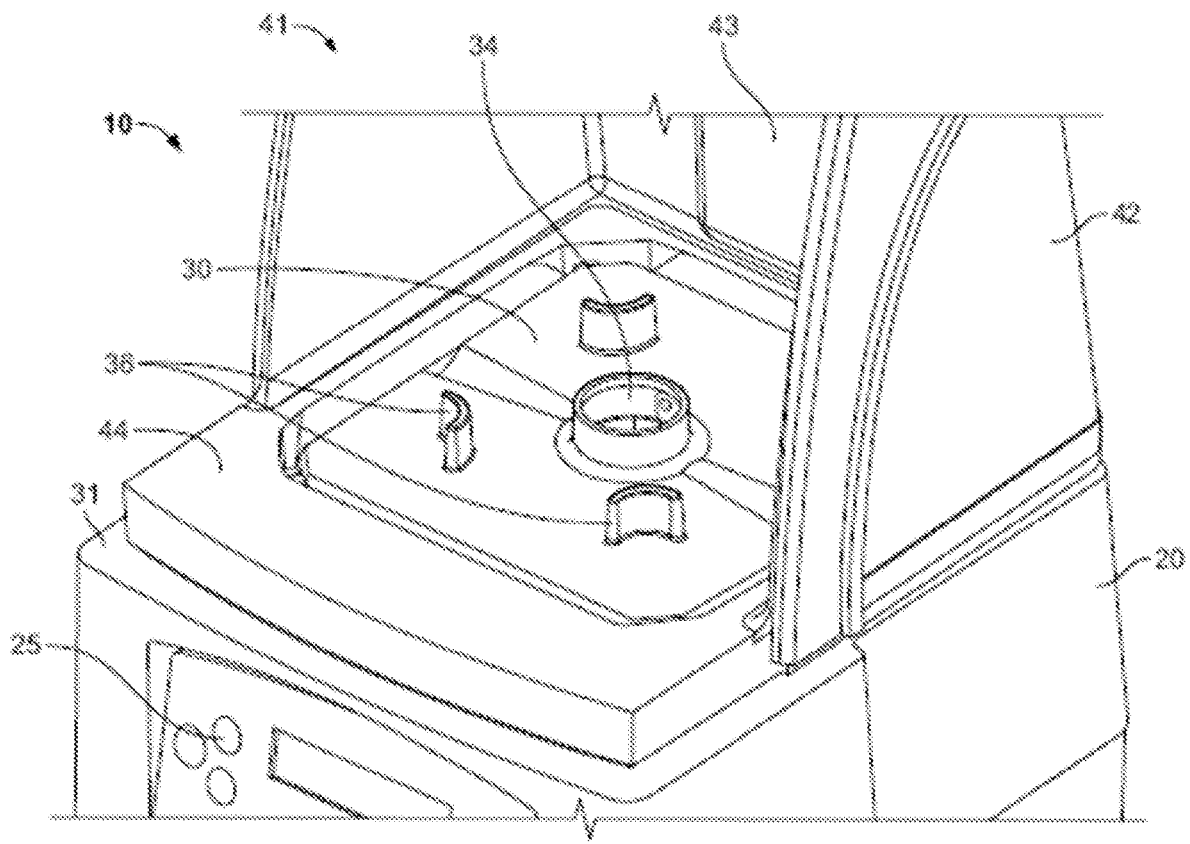
FIG. 1A is a three dimensional perspective view of certain aspects of the enclosure in an engaged, operational state.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Similar reference numerals are used throughout the figures. Therefore, in certain views, only selected elements are indicated even though the features of the assembly are identical in all of the figures. In the same manner, while a particular aspect of the invention is illustrated in these figures, other aspects and arrangements are possible, as will be explained below.

The present system provides an enclosure which engages the base unit via friction fit created by one or more engagement members, so that a rotation of the enclosure and base relative to one another secures the enclosure to the base with an audible or tactile confirmation. When so installed, the enclosure reduces noise and allows for a number of failsafe features to ensure the safe and secure operation of the blender.

In one embodiment, provided is a blender assembly that comprises a base member, said base member housing a motor. A pedestal extends from the base member and defines a peripheral edge. An enclosure provides a sound barrier to said base member, the enclosure comprises a body portion including sidewalls and a base portion that defines a cavity wherein the base portion is configured to engage the pedestal and wherein the enclosure is pivotal between a locked and unlocked position that is selectively securable to the pedestal.

The base portion of the enclosure includes an aperture that defines an opening to receive the pedestal. The base portion and the pedestal include a plurality of engagement members and a plurality of engagement channels wherein the engagement members cooperate with the plurality of engagement channels to selectively secure the enclosure to the base member. In one embodiment, the pedestal includes a plurality of engagement members and the base portion includes a plurality of engagement channels wherein the pedestal includes four engagement members and said base portion includes four engagement channels. The engagement channels include a channel for selectively receiving said engagement member, said channel may be defined by a retention lip, a guide stop, a back wall and a top wall. The aperture may be shaped to selectively receive the peripheral edge of the pedestal wherein rotation of the enclosure relative to the pedestal selectively locks and selectively unlocks the enclosure to the pedestal. Feedback confirmation may be generated by the blender assembly to identify when the enclosure is in the locked position and when the enclosure is in the unlocked position. The feedback confirmation includes an electric sensor in communication with the base unit that generates an audible signal or a visual signal.

In another embodiment, provided is an enclosure for a blender assembly that is operable to surround a blending container while on a blender, said enclosure comprises a body portion having opposed sidewalls and a rear wall with an open area opposed to the rear wall and a cover pivotally attached to the body portion to cover the open area. A base portion may be attached to the body portion, said base portion defines an aperture having a sidewall. A plurality of engagement channels may be positioned along the sidewall of the aperture wherein the engagement channels may be aligned with a plurality of engagement members positioned along a pedestal of a blender. The engagement members may be pivotal relative to the engagement channels. The enclosure may be pivotal between a locked and unlocked position relative to the pedestal. Further, the enclosure may be rotatable relative to the pedestal to engage and to disengage the engagement members with the engagement channels. The enclosure may be rotated less than 90 degrees to selectively engage and disengage the engagement members with the engagement channels. Further, the enclosure may be rotated less than 45 degrees to selectively engage and disengage the engagement members with the engagement channels. Also, the enclosure may be rotated less than 20 degrees to selectively engage and disengage the engagement members with the engagement channels.

Also provided is a method for enclosing a blender assembly. The method comprises providing an enclosure having a base and sidewalls that define a cavity. A blender base unit having a pedestal is also provided. The base of the enclosure may be positioned on the blender base unit. The enclosure may be pivoted relative to the pedestal to engage the enclosure to the blender base unit. The step of positioning the base of the enclosure on the blender base unit may further comprise receiving, in an aperture of the base, a pedestal. Additionally, a plurality of engagement members may be aligned with a plurality of engagement channels. The plurality of engagement members may be rotated relative to the plurality of engagement channels to engage the enclosure to the blender base unit. The enclosure may be rotated less than 45 degrees to engage the engagement members with the engagement channels. Also, the enclosure may be rotated less than 20 degrees to engage the engagement members with the engagement channels.

Some traditional blender systems have a blender base unit with a removable cover. The cover is connected via screws or is deformed (e.g., flexed, bent, etc.) so that it can be attached to the base. This can cause wear to the cover or may result in vibrations as a blender is operated. In some instances, a blender motor may produce sufficient vibrations to cause a cover to disengage, translate, or otherwise move relative a blender base.

Described herein are blending systems and methods that may allow a blender base to be coupled with a cover. The cover and blender base may be locked or coupled via a twisting action as described herein. In embodiments, a centering pad may be operatively positioned such that vibrations produced from a blending process are absorbed by the centering pad. It is noted that the centering pad may additionally or alternatively provide a physical stop that operatively prevents or reduces occurrences of the cover from twisting due to vibrations cause by operation of a blender motor.

Also described herein is a blender system with a centering pad that operatively receives one or more different types of containers. For instance, the centering pad may receive a traditional blending container, a single serving container, or a food processing bowl-type container. The centering pad may include formations that allow one or more different types of containers to be twisted and locked with the centering pad. The twisting action may allow the container to be held in place or may otherwise reduce movement of the container during operation. It is noted that some embodiments may provide a centering pad that includes one or more formations corresponding to one or more different containers. For example, a centering pad may include formations that twist-lock with a food processor bowl, and may be free from formations that twist-lock with a traditional blender container.

With reference to FIGS. 1A through 2C, the blender assembly 10 includes a blender base or base unit 20 and an enclosure 40. The base unit 20 encloses an electric motor (as described with reference to FIG. 5) connected to a power supply (e.g., alternating current, portable direct current power source, etc.). The motor may be controlled by control panel 25, which may include any number of interface options, including an on/off switch, pre-programmed routines for adjusting the speed and duration of blending, and the like.

Figure 5:
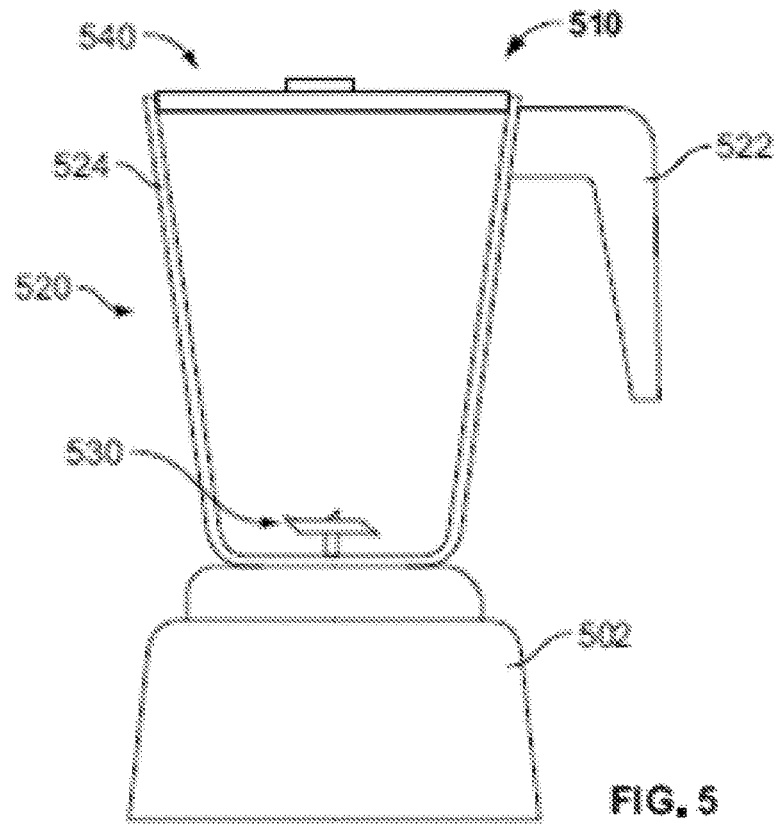
FIG. 5 illustrates an exemplary blending system in accordance with various disclosed embodiments.

Base unit 20 also includes a raised pedestal 30 on a top surface of the base unit 20, which is adapted to be received in a base portion of a container (as shown in FIG. 5). Pedestal 30 may include one or more projections 36 extending upwardly therefrom which, when received by the base portion of the container, assist to prevent the container from rotating when the motor within base unit 20 is actuated. The container may be shaped to engage the pedestal 30 at a variety of points, as will be described in more detail below.

Figure 1B:
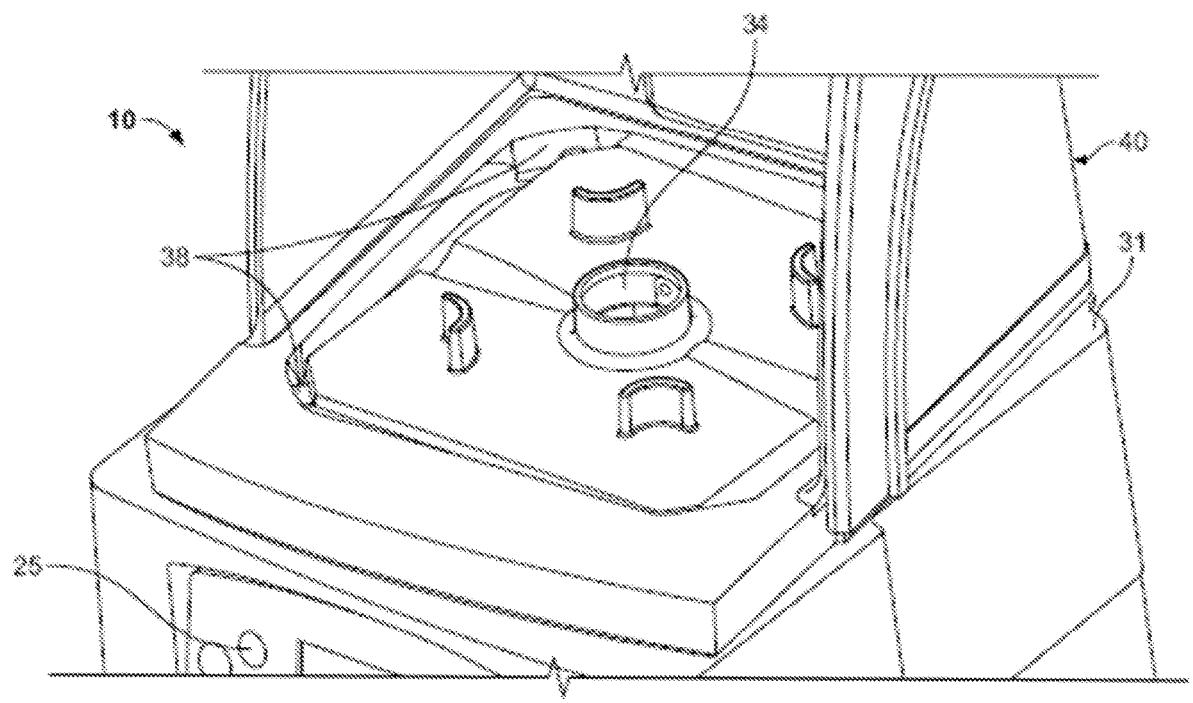
FIGS. 1B and 1C are, respectively speaking, three dimensional perspective views of certain aspects of the enclosure in a position wherein the enclosure's engagement members are disengaged and wherein the enclosure is removed from the base unit.
Figure 1C:
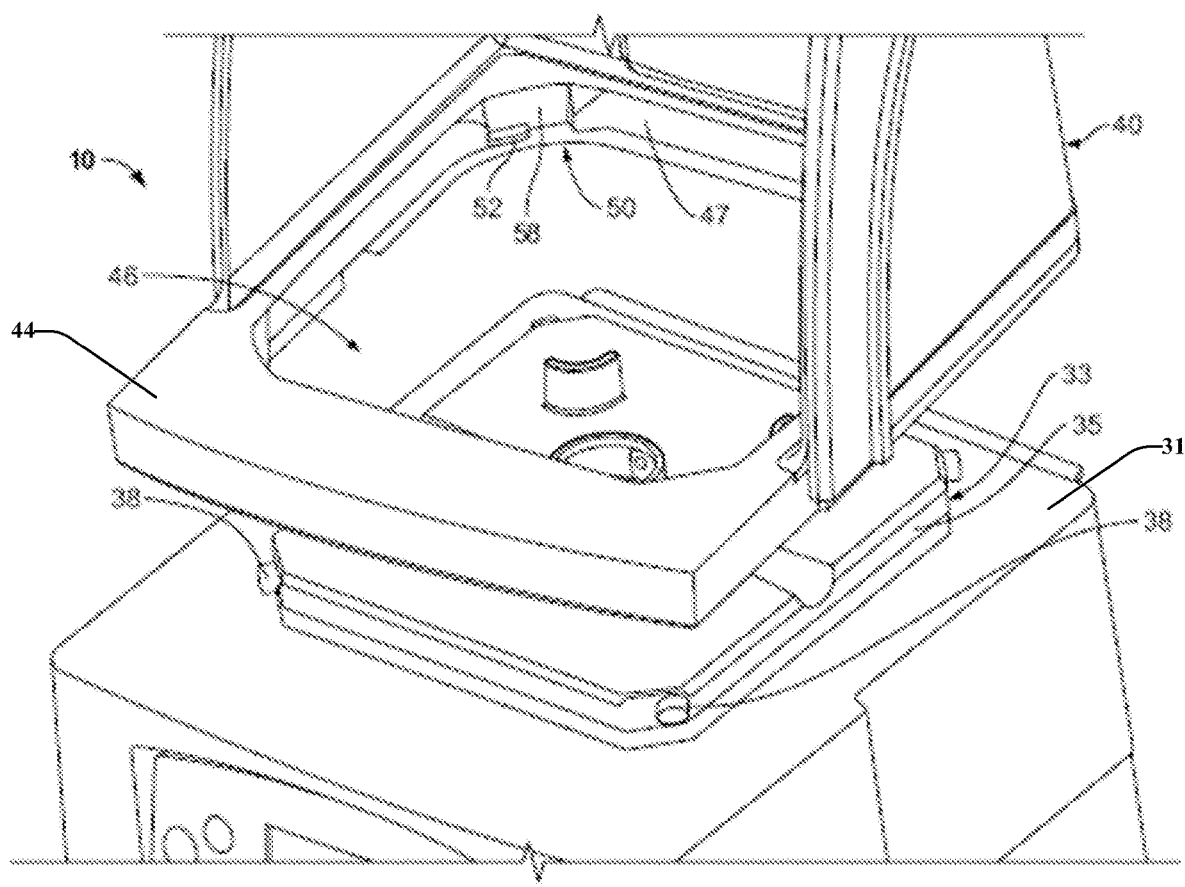

In embodiments, the pedestal 30 extends away from the base unit 20 in order to provide a point of engagement with the container. At the same time (and as is best illustrated in FIGS. 1B and 1C), a top surface 31 generally adjacent to the pedestal 30 forms a seating surface for an enclosure 40. The enclosure 40 may include a base 44 having corresponding structures thereon such that one or more seals or gaskets may conform with the top surface 31 and/or the pedestal 30 so as to promote a more sound-proof and/or water-tight seal. It is noted that a gasket may be disposed between at least a portion of the base 44 of the enclosure 40 and the blender base 20. The gasket may generally isolate or reduce vibrations between the blender base 20 and the enclosure 40.

The top facing portion 32 of the pedestal 30 includes a coupler 34 for engaging the blade assembly of a blending container as described herein. A splined drive shaft, which may extend from the blade assembly within the container, may engage a splined end of a rotating motor shaft within the coupler 34 that cooperates with a motor in the blender base 20. Rotation of the motor shaft caused by actuation of the motor is thereby transferred to the drive shaft and the blades rotatably positioned within the container. As such, the coupler 34 may include a complementary shaped end associated with the motor that is engageable with a shaft of the blade assembly to drive the blade assembly in the container.

The one or more projections 36 may also be formed on the top facing portion 32 to interact with and secure a blending container or the like. For instance, a container may be shaped such that physical features of the container interact with the protrusions to prevent the container from rotating due to rotation of a blade assembly. In some aspects, a plurality of projections 36 are formed with shapes that cooperate with corresponding recesses in the container. In at least some embodiments, the pedestal 30 may include latches, fasteners, magnets or other formations that secure a container to the blender base 20.

The enclosure 40 includes a body portion 41 having opposed sidewalls 42 spanned by a rear wall 43 wherein the sidewalls 42 and rear wall 43 extend upwardly from the base 44 and define a cavity. The base 44 and the walls 42, 43 may be monolithically formed to one another or may be made by separate components attached to one another. The body portion 41 may include an open front area opposed to rear wall 43, which front area may be closed by a cover (not shown) to form the enclosure 40.

The enclosure 40 may be designed to generally surround the container as it is positioned on the pedestal 30. The cover may be hinged to open and close the enclosure 40 to allow for access therein and to allow the container to be positioned on the pedestal or be removed. It is noted that the cover may be hingedly secured to the body portion 41, removably secured to the body portion 41, or otherwise attached thereto. In some embodiments, the enclosure 40 may not comprise a removable cover and may require the enclosure 40 to be completely removed to allow access to the container. In another aspect, a gasket may be disposed between the cover and one or more of the walls 42, 43. It is noted that gaskets may be utilized as described with reference to U.S. patent applications RE45,655 and RE45,308, the entireties of which are incorporated by reference herein. The entirety of the enclosure 40, including the base 44, side walls 42, rear wall 43 and cover may be selectively attached to the pedestal 30.

Figure 7:
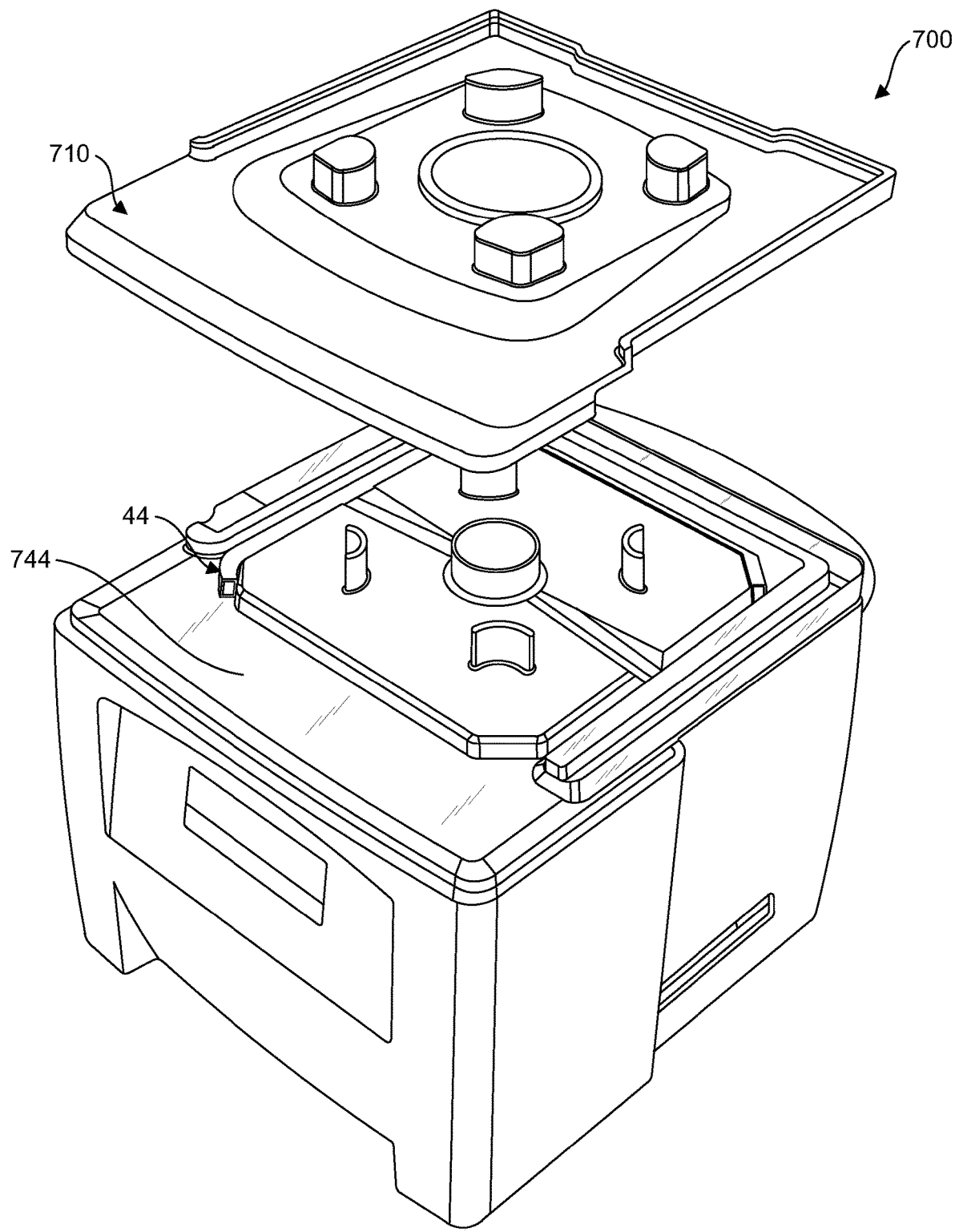
FIG. 7 illustrates the blending system of FIG. 6 with a partial cross-section of a cover in accordance with various disclosed embodiments.

The pedestal 30 may also include a shape that cooperates with an aperture 46 in the enclosure 40. It is noted that the aperture 46 may be defined through the base 44. In some embodiments, the base 44 may be shaped to generally form a frame around the aperture 46. It is noted, however, that the base 44 may comprise other or different shapes. For instance, the base 44 may include a front flange 744 (as shown in FIG. 7) that spans an area in front of the pedestal and between the side walls 42. Some embodiments may not include the front flange 744 so that the base 44 of the enclosure 40 may be generally open between the side walls 42 and the base 44 and may form a "U" shape.

Figure 3:
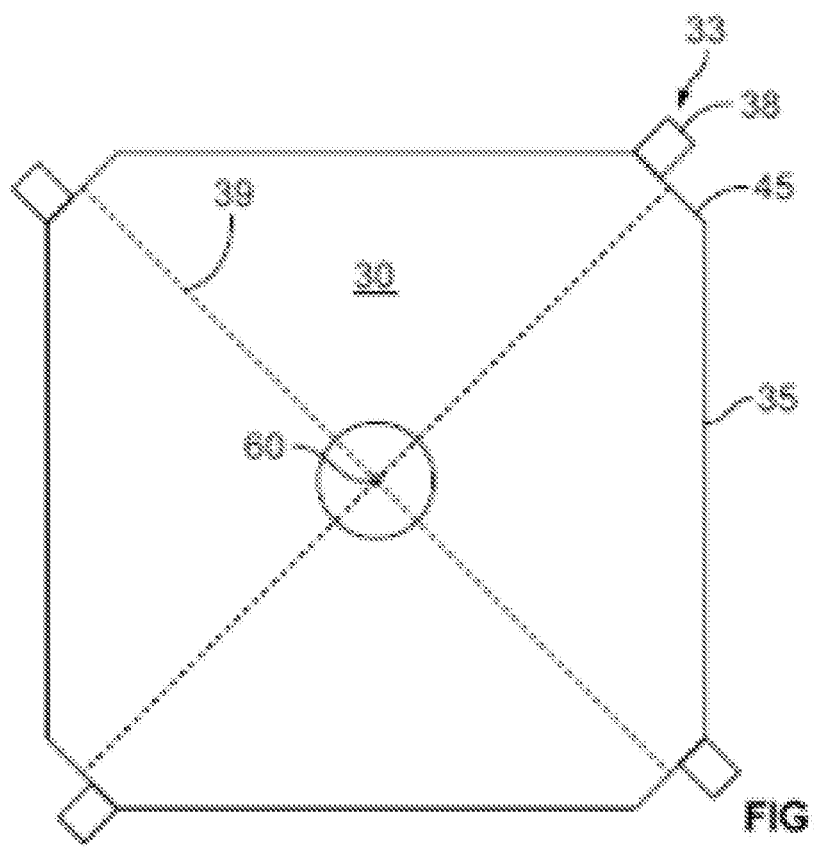
FIG. 3 illustrates a schematic plan view of an embodiment of a pedestal of a blender in accordance with the instant disclosure.

In at least some embodiments, pedestal 30 may have a substantially square or rectangular profile when viewed from the top, with recessed or rounded edges 33. Other pedestal shapes are possible, including ovals or circles with flattened portions serving as the recessed edges and/or regular or irregular polygons. Engagement members 38 may extend orthogonally or in other arrangements from pedestal sidewalls 35 as illustrated by FIG. 1C. In certain aspects, members 38 are provided along the recessed edges 33 in an arrangement wherein the members 38 all align with a central radius 39 wherein they may extend a common distance from a central axis 60 (FIG. 3). At least one member 38 may be required, with additional members being preferred. In certain embodiments, four engagement members 38 are provided at the recessed edges 33 of a platform having a four-sided shape (when viewed from the top). In one embodiment, the rounded edges 33 may include a flat portion 45 adjacent to the engagement member 38.

Figure 2A:
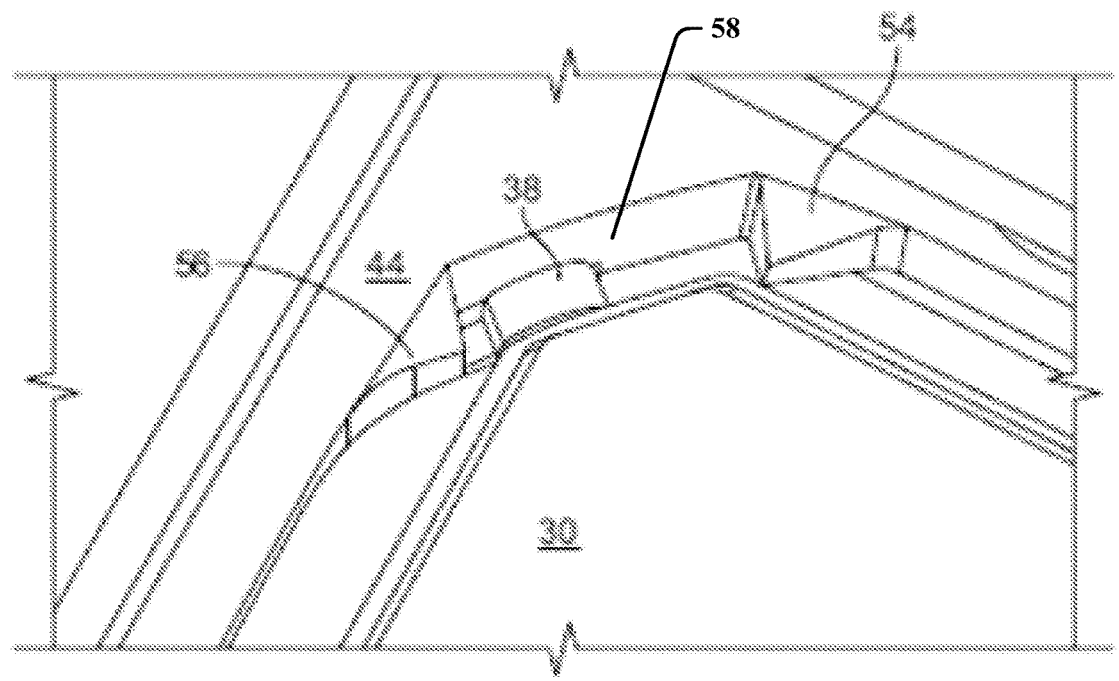
FIG. 2A is a three dimensional top view, corresponding to aspects depicted in FIG. 1A, of an engagement member in its engaged, operational state.
Figure 2B:
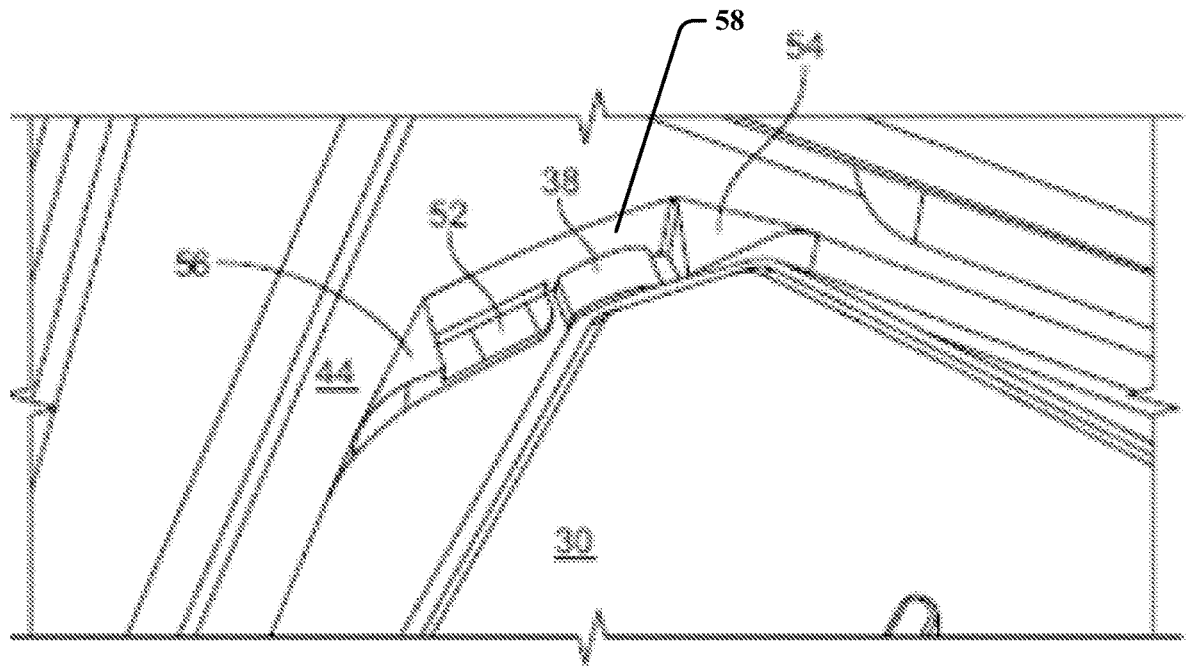
FIGS. 2B and 2C are, respectively speaking, three dimensional top views, corresponding to aspects depicted in FIGS. 1B and 1C, of an engagement member in the disengaged and removed state.
Figure 2C:
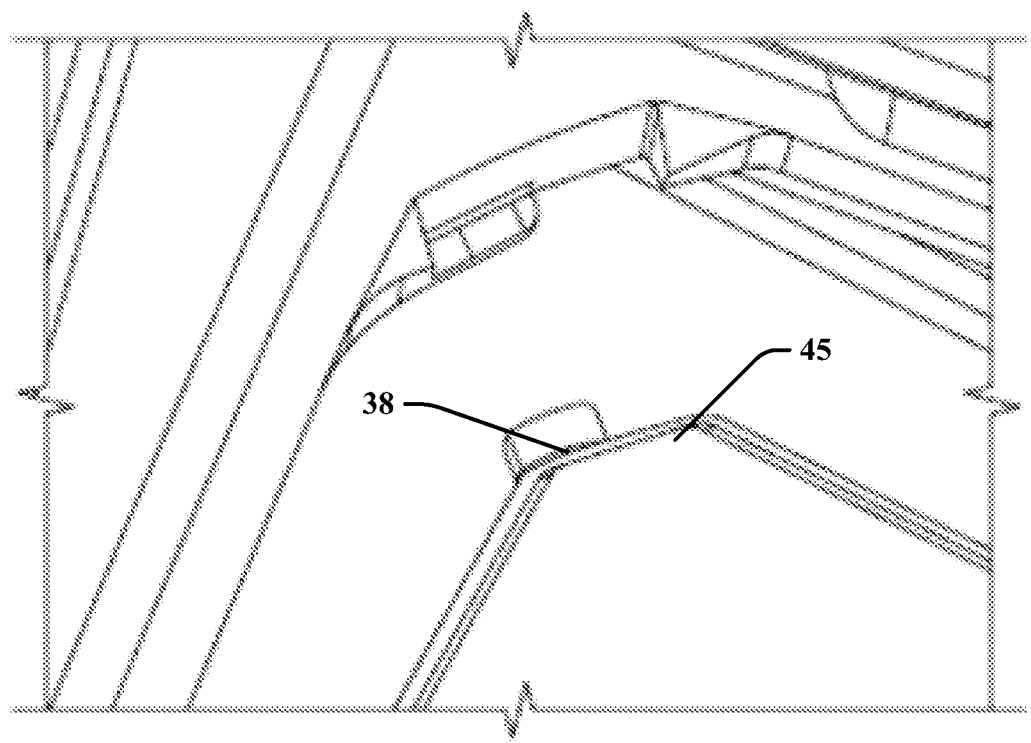

Engagement members 38 cooperate with engagement channels 50 formed in a peripheral edge 47 of the base 44 of enclosure 40. The peripheral edge 47 may generally define the aperture 46 within the base 44 wherein the aperture 46 may have a size that cooperates with the perimeter of the pedestal 30 to allow for the pedestal 30 to be received therein. As the pedestal 30 is received within the aperture 46, engagement members 38 may be aligned with and received within the engagement channel 50. The engagement channel 50 may include a retention lip 52, a guide stop 54, a back wall 56, and a top wall 58. After the pedestal 30 is received within the aperture 46, the enclosure 40 may be pivoted such that the engagement members 38 may be aligned through the channel 50 into a locking position adjacent to the back wall 56. The engagement members 38 may frictionally contact along the retention lip 52 and be positioned towards the back wall 56 when the enclosure 40 is pivoted into an engaged position with the pedestal 30, as shown in FIGS. 1A and 2A.

Further protrusions, friction-fitting grooves, spring-loaded pegs, or other similar mechanisms may provide nominal resistance and/or produce an audible clicking sound to alert the user when the members 38 are in the engaged/locked position. In the same manner, a pressure/load sensor, a contact circuit, and/or magnets coupled to reed switches may be provided in these respective parts, along with appropriate circuitry in the blender base 20 to provide an indication when the enclosure 40 is properly positioned. In some aspects, this indication may involve visual, tactile, and/or audible aspects, such as light emitting diode indicators, a graphical display, an alert signal, a voice message, and the like. In further aspects, operation of the motor may be made contingent upon sensing proper installation of the enclosure.

Additional locking mechanisms might be provided so as to better secure and attach the enclosure to the base. For example, by way of additional projections, activation of electromagnets, and the like. These additional locking mechanisms can be designed so that they can be released while the motor is in operation. Additionally or alternatively, the additional locking mechanisms might be latches, pegs, or fasteners located at the interface of the top surface 31 and enclosure 40 which the user positions before the motor can be engaged. Additionally, a bottom portion of the base 44 may rest on the top surface 31 of the blender base 20 when the enclosure 40 is in the engaged or locked position.

The entirety of the enclosure 40, including the base 44, side walls 42, rear wall 43, and the top portion including a pivoting opening (not shown), may be rotated relative to the base unit 20 to allow for such tactile engagement. While the aperture 46 in the figures is shown to have a substantially similar shape as that of the pedestal 30 (i.e., generally square), it may be possible to provide differing shapes for the pedestal and enclosure so long as sufficient engagement between the pedestal 30 and the enclosure 40 can be achieved at a plurality of points (e.g., a circle fitting within a square, etc.). Additional structure may be included in the channel 50 and/or along other contact points between the base 44 of the enclosure 40, side walls 35 of the pedestal 30, and/or top surface 31 of the blender base 20, and these portions may be partially constructed from materials which present resistance/friction when they are slid across their intended range of motion. Guides may also be fashioned in the top surface 31 to simplify locating the proper orientation of the enclosure and base.

To disengage the enclosure 40 from the pedestal 30, the enclosure may be pivoted oppositely from the initial direction wherein the frictional engagement between the engagement members 38 and the retention lip 52 of the engagement channel 50 is overcome. Notably, feedback notice may be generated in the form of a tactile pulse to the user, audible sound, visual display, or any combination of these notices.

The materials of the base 20, pedestal 30, and enclosure 40 may of any type, although durable, moldable polymers may be particularly useful. Metal, glass, and ceramics may also be used. In the same manner, gaskets may be interposed at any of the contact points (i.e., enclosure to peripheral edge, within the engagement channel, etc.) to allow for a better seal. Such gaskets may be formed of amorphous polymers, semicrystalline polymers, biopolymers, bitumen materials, and the like.

In one embodiment, the pivoting of enclosure 40 relative to the blender base 20 may be in the form of a slight rotation in a single, horizontal plane with a circular rotation between the elements. However, three dimensional movements could be accommodated in certain aspects as the engagement members 38 and the engagement channels 50 may be provided in various orientations relative to one another to accomplish various pivoting movements. For example, channel 50 could be formed to include a retention lip 52 having a twisted or screw-like shape. In such aspects, the final resting place for the member 38 could be provided as a plateau and/or with a resting groove. In the same manner, the members 38 and channels 50 need not be symmetrically situated, and varying elevations or positions could be used so as to prevent improper installation of the enclosure 40. In the same manner, the relative shape of the enclosure 40, its base 44, the pedestal 30, and/or the base unit 20 can be fashioned to provide additional visual cues for the user as to the correct installation. As noted above, electronic mechanisms, including reed switches, magnetic switches, proximity or load sensors, and other similar devices, can be employed in the base, the container, and/or other components for purposes of verifying installation, as well as allowing or preventing operation of the blender itself under certain conditions. In another aspect, NFC sensors or other wireless sensors may be utilized to determine whether the enclosure 40 is attached to the base unit 20.

Figure 4A:
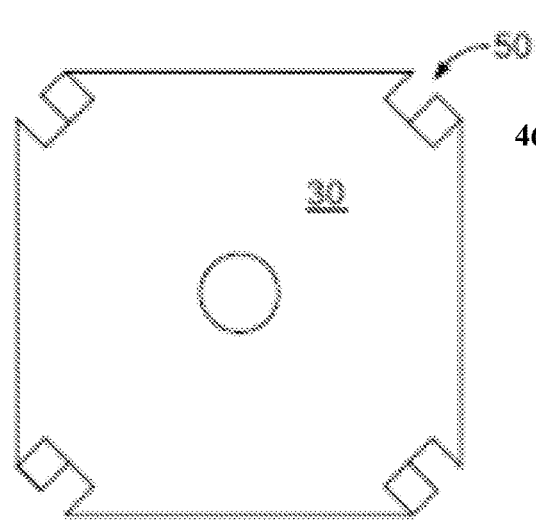
FIGS. 4A and 4B are, respectively, schematic plan views of another embodiment of the pedestal and a base of the enclosure in accordance with the instant application.
Figure 4B:
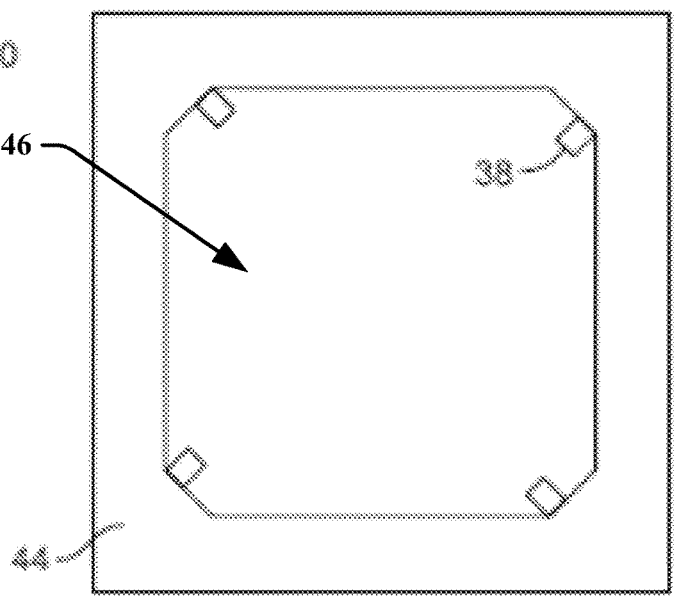

In another embodiment as illustrated by FIGS. 4A and 4B, the engagement members 38 may be positioned along the aperture 46 of the base 44 and the engagement channels 50 may be positioned along the pedestal 30. This rearrangement of members relative to each other may also include various orientations wherein the pedestal 30 may include both engagement members 38 and engagement channels 50 and the base 44 may include both engagement members 38 and engagement channels 50. These staggered orientations may also allow for the alignment of the engagement members to the engagement channels to achieve pivotal connection between the enclosure 40 and the base unit 20.

Figure 6:
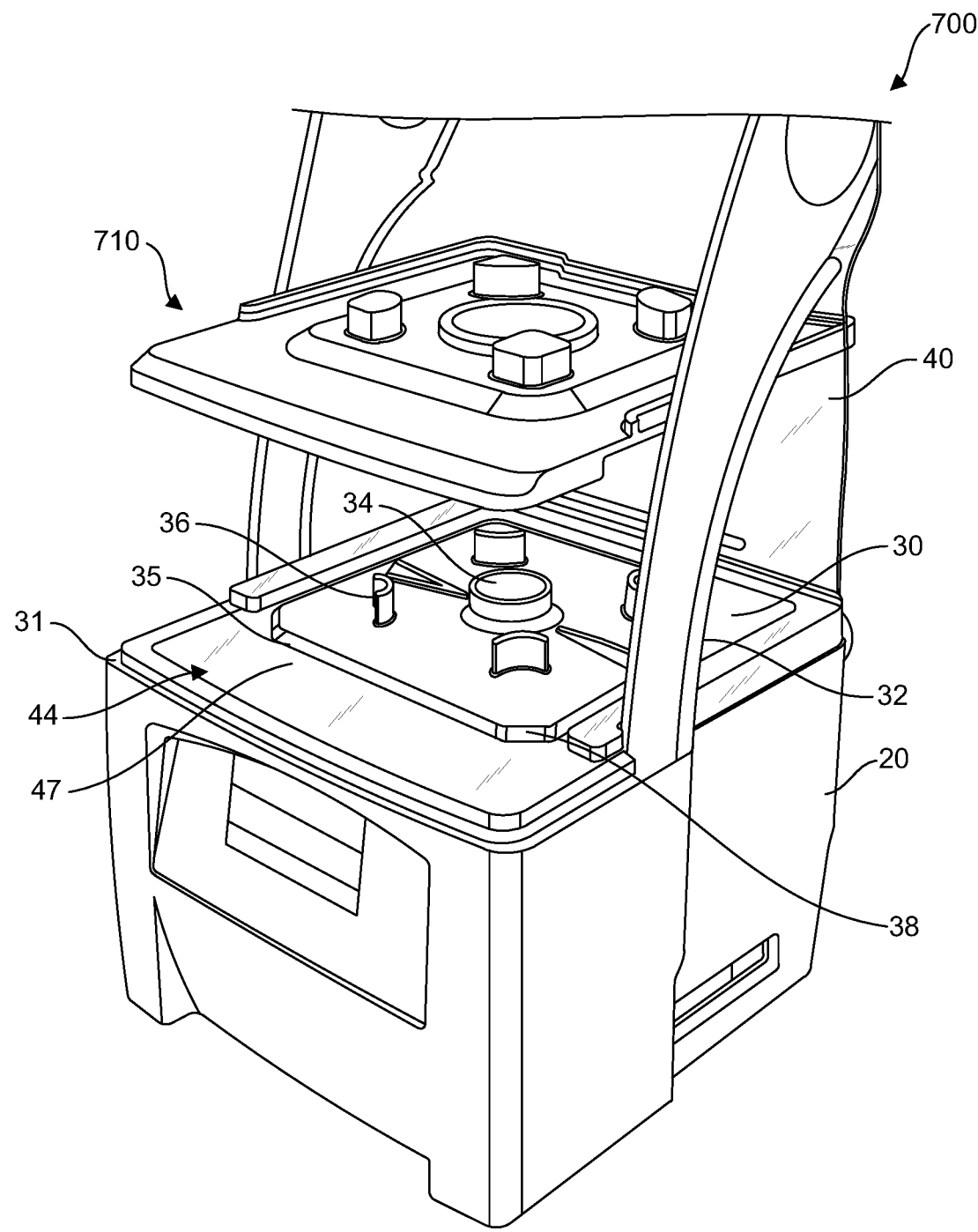
FIG. 6 illustrates an exemplary blending system including a centering pad in accordance with various disclosed embodiments.
Figure 8:
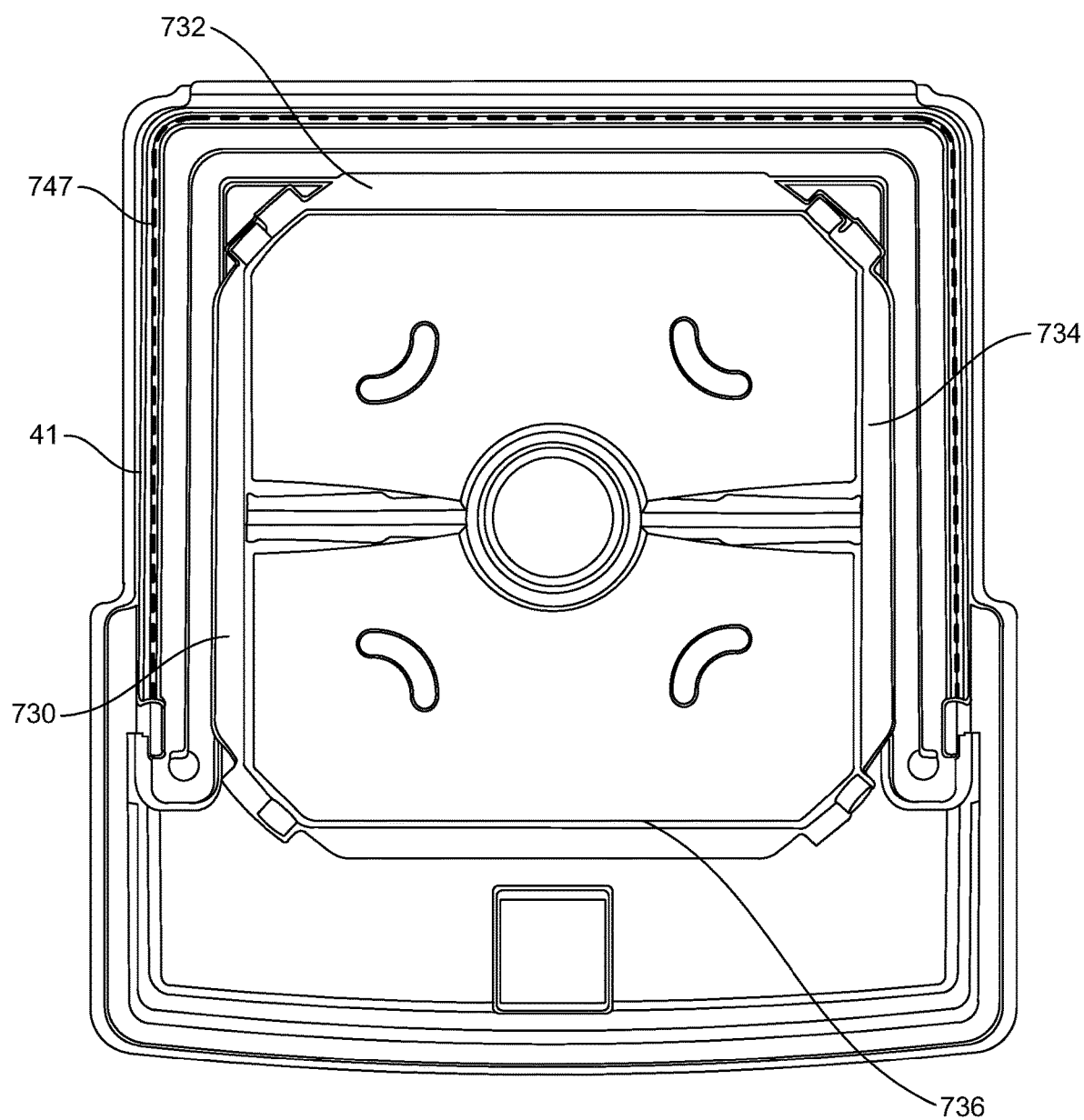
FIG. 8 illustrates a top view of the blending system of FIG. 6 with a partial cross-section of a cover in accordance with various disclosed embodiments.
Figure 9:
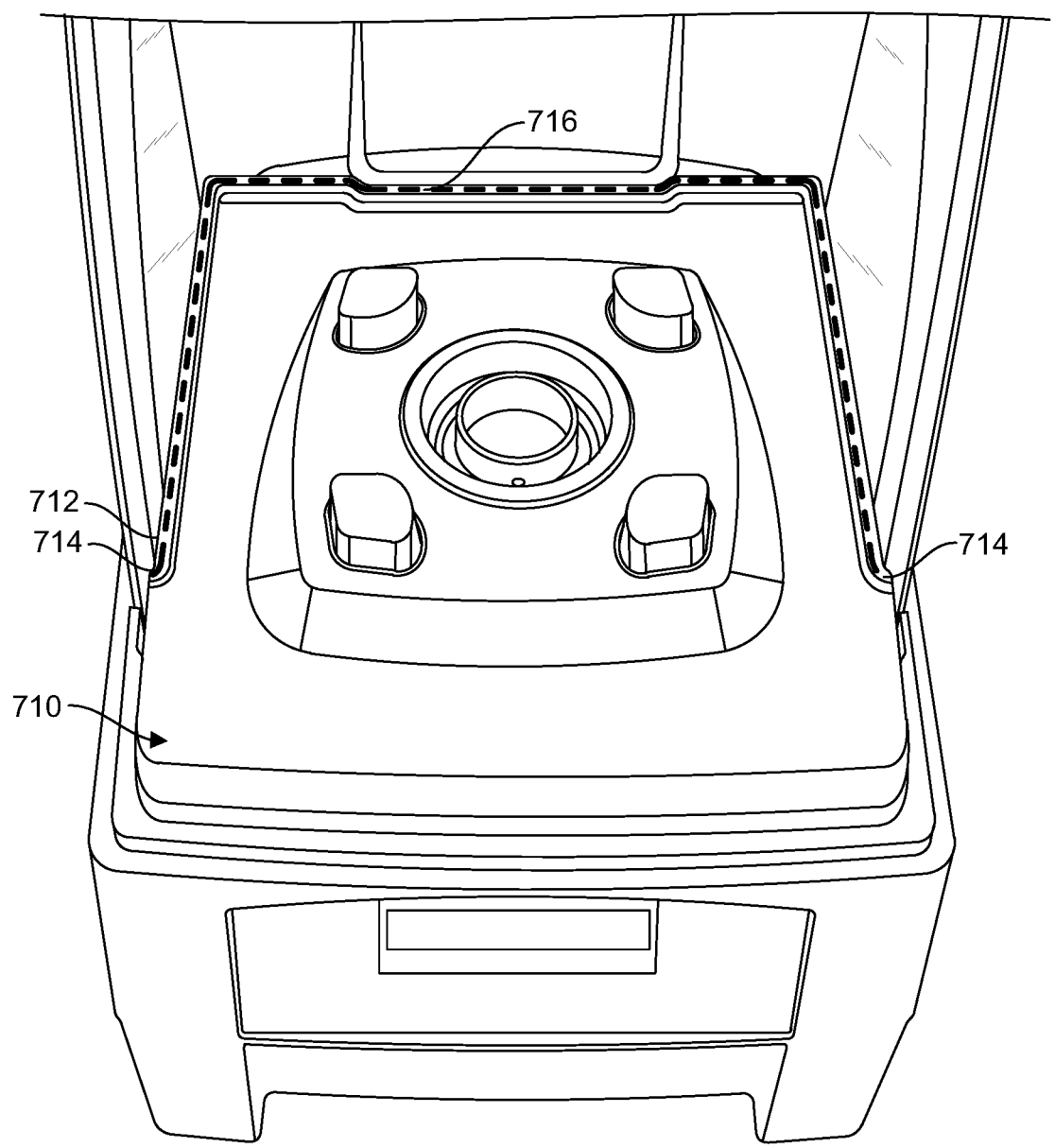
FIG. 9 is a front, and top perspective view of the blending system of FIG. 6 with the centering pad attached to the system in accordance with various disclosed embodiments.
Figure 10:
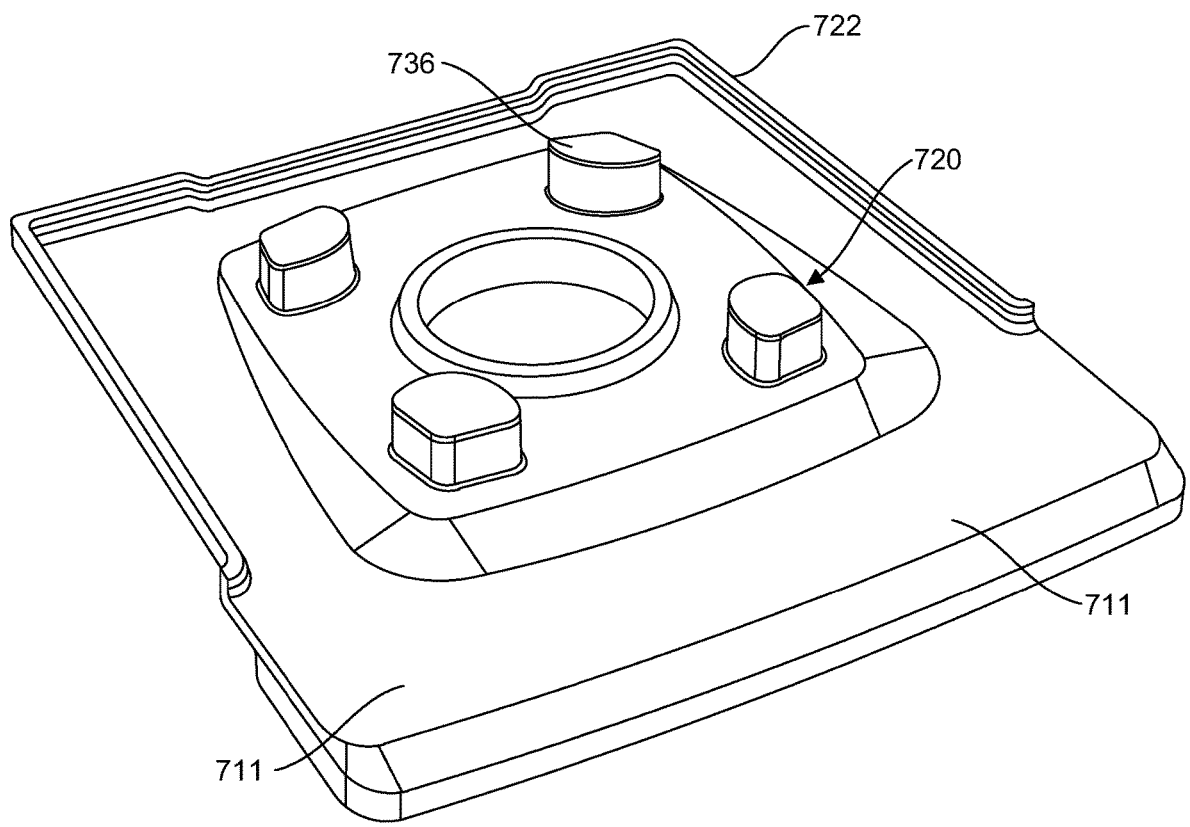
FIG. 10 is a top perspective view of a centering pad in accordance with various disclosed embodiments.
Figure 11:
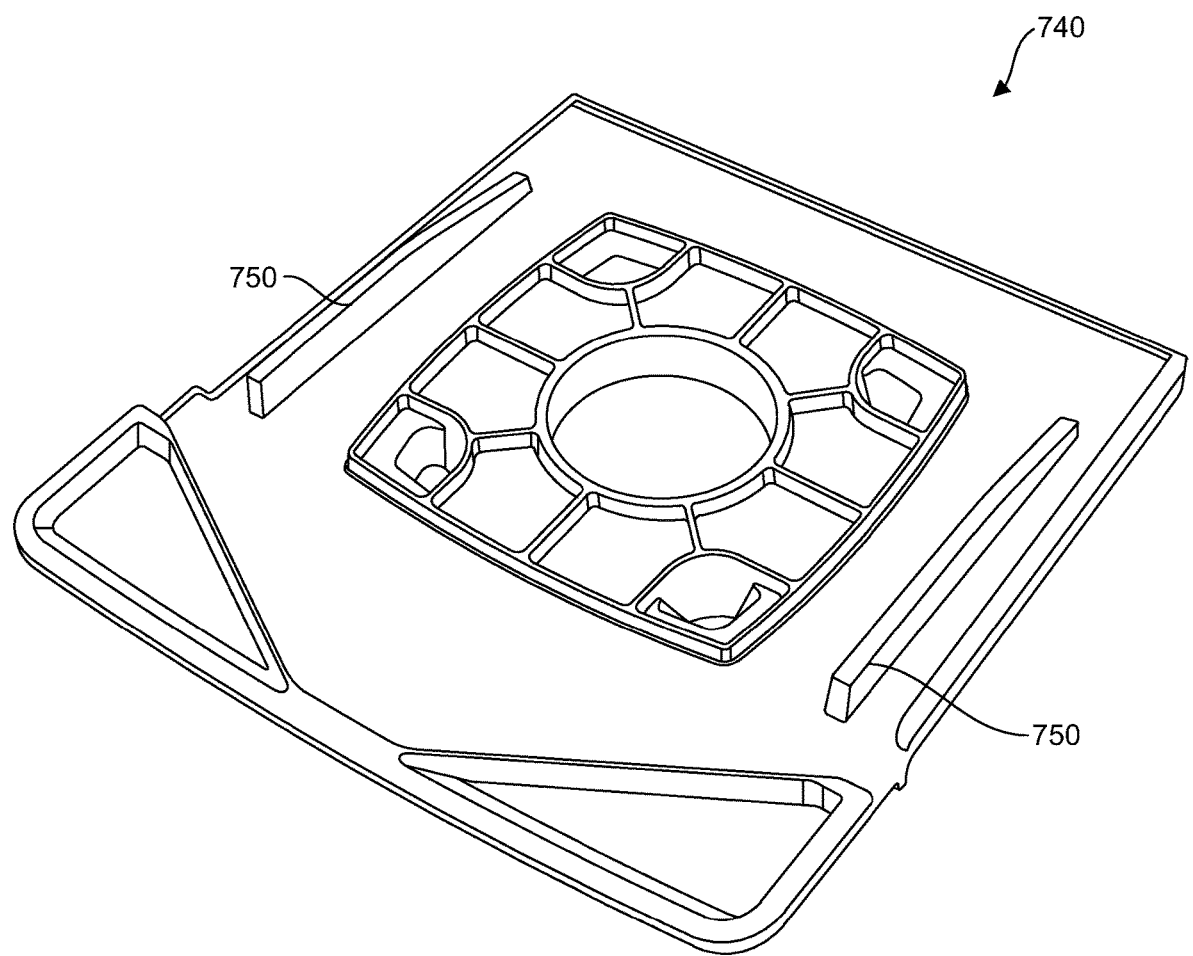
FIG. 11 is a bottom perspective view of a centering pad in accordance with various disclosed embodiments.
Figure 12:
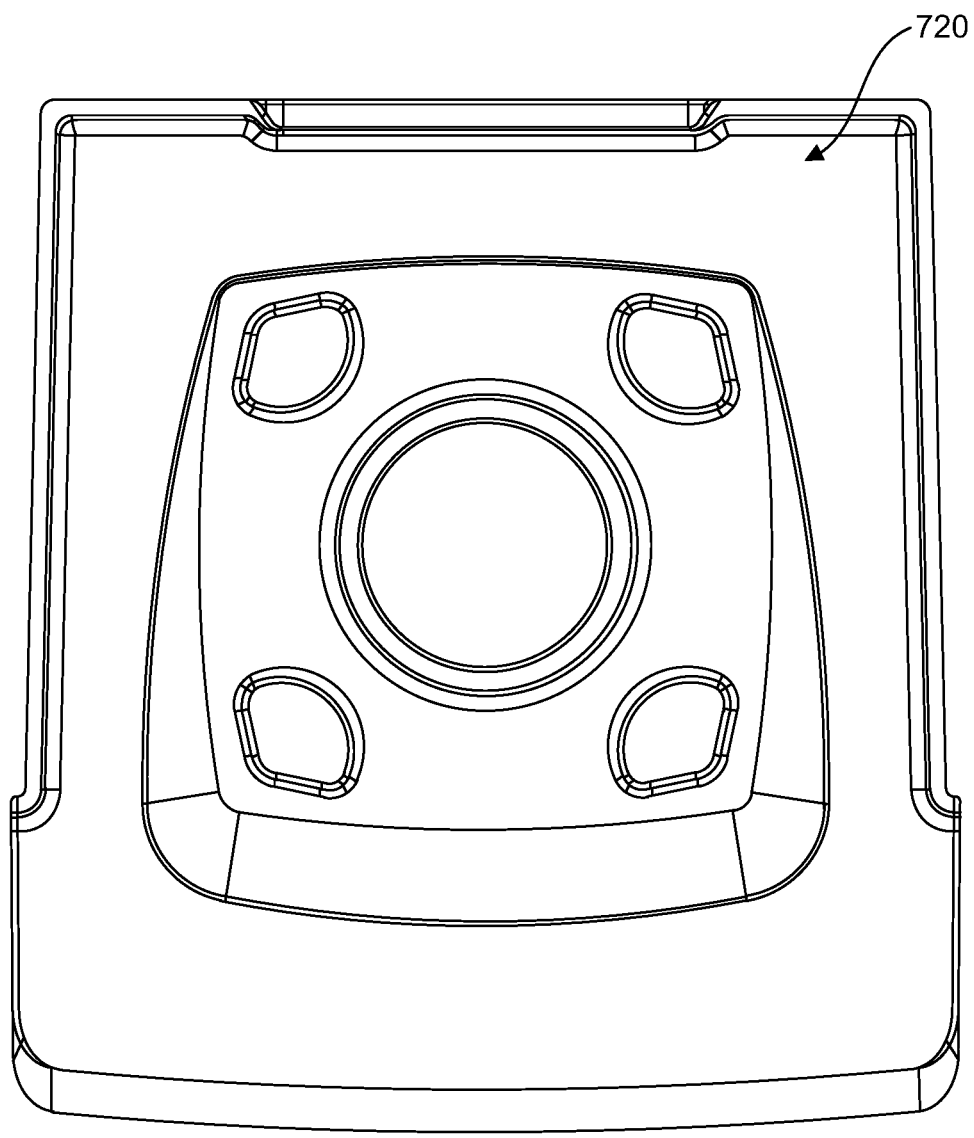
FIG. 12 is a top planar view of a centering pad in accordance with various disclosed embodiments.
Figure 13:
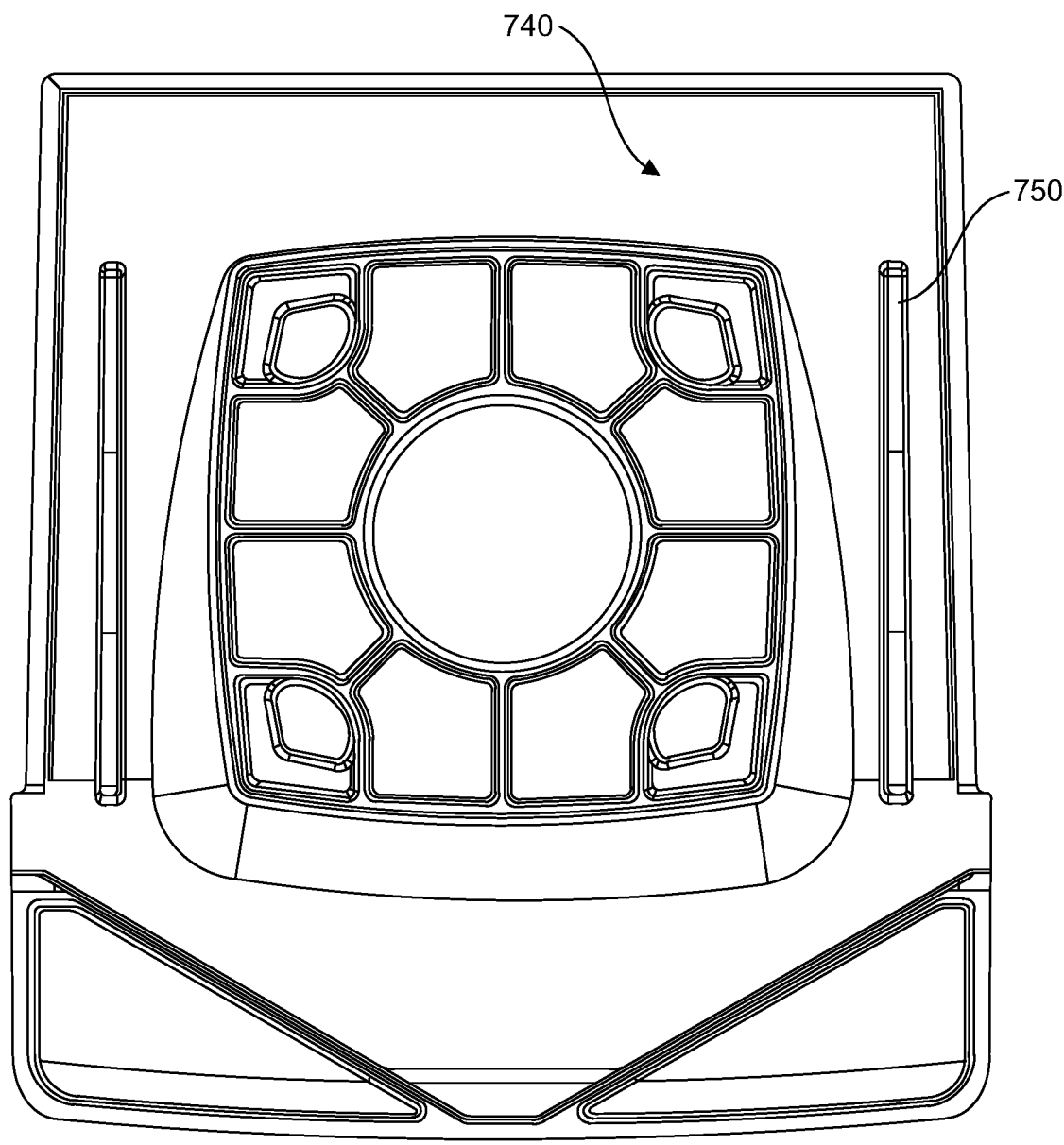
FIG. 13 is a bottom planar view of a centering pad in accordance with various disclosed embodiments.
Figure 14:
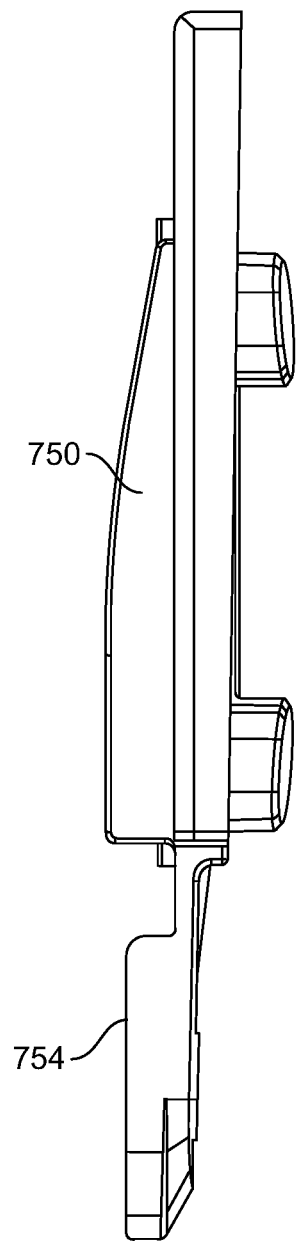
FIG. 14 is a side view of a centering pad in accordance with various disclosed embodiments.

Turning to FIGS. 6-8, there depicted is a blending system 700. It is noted that like named and numbered components may comprise the same or different aspects as described with reference to FIGS. 1-5. For instance, the blender base for FIGS. 1-5 may be generally the same or similar to the blender base of FIGS. 6-8—although the present disclosure is not limited to this.

With reference to FIGS. 10-14, a centering pad 710 may be operatively attached to at least one of the pedestal 30 or the enclosure 40, as described in more detail herein. For instance, the centering pad 710 may be directly attached to the pedestal 30 and may overlay on the base 44 of the enclosure 40 or top surface 31 of the blender base 20. In another embodiment, the centering pad 710 may be attached to peripheral edge 47 of the enclosure 40. The centering pad 710 may be positioned after the enclosure 40 is positioned in an operative location relative to the blender base 20 or prior to positioning of the enclosure 40 on the blender base 20. It is noted that the centering pad 710 may be attached to the system 700 via a press fit, snap fit, magnets, friction fit, hook and loop fastener, mechanical fastener, chemical or mechanical adhesives, or the like. In an aspect, the centering pad 710 may generally provide a physical stop so that the enclosure 40 does not disengage from or twist relative to the base as a result of vibrations from the blender base 20. It is noted, however, that a user may provide sufficient force to twist the enclosure relative to the base in some instances. The force needed to twist such is generally greater than the force produced during a blending process.

The centering pad 710 may comprise an elastomeric material, such as a food-grade rubber (e.g., silicon, etc.). The centering pad 710 may include a body 711 comprising a first side 720 and a second side 740. When operatively positioned on the blending system 700, the first side 720 may be opposed to the blender base 20 and the second side 740 may abut or face the blender base 20.

It is noted that the centering pad 710 may include projections 736 that may receive projections 36. In embodiments, the projections 736 may include a recess or hollow portion that is sized and shaped to receive the projections 36. It is noted that the projections 36 may frictionally fit within the projections 736. The projections 36 may provide a rigid support for the projections 736. It is noted that the system 700 may include any number of projections 736 and projections 36. In embodiments, the projections 736 may contact a container and may absorb vibrations during operation of a motor.

As best shown in FIGS. 6-9, the body portion 41 of the enclosure 40 may generally include an inner periphery 747 that may be defined by the side walls 42 and rear wall 43. It is noted that FIGS. 7-8 illustrate the cover 40 with portions of the side walls 42 and rear wall 43 removed while the base 44 remains for visibility and simplicity of explanation.

Referring to FIGS. 10-14, with reference to FIGS. 6-9, the centering pad 710 may include a perimeter 712 that generally corresponds to the inner periphery 747 of the body portion 42. In an aspect, the perimeter 712 may be sized and shaped to generally mirror the inner periphery 747. It is noted that the perimeter 712 may include features 714 and 716 that generally mate with features of the body portion 42. The features 714 and 716 may include flanges, lips, or the like. In an aspect the features 714 and 716 may reduce, prevent, or assist in restraining the cover 40 from rotating as a result of vibrations from the motor. In at least some embodiments, the perimeter 712 may include a generally raised portion or wall 722 that may protrude from the first side 720. In another aspect, the wall 722 may generally direct liquids or other debris in an appropriate direction. For instance, the wall 722 may direct liquids away from the intersection of side walls 42 and pedestal 30 or centering pad 710. This may prevent or reduce liquids from flowing in between the side walls 42 and pedestal 30, or in between the side walls 42 and centering pad 710. In embodiments, the sidewalls 42 direct liquid out of the cover 40 and towards an opening so that a user can wipe or collect the liquid.

The centering pad 710 may be positioned, for example, before or after the cover 40 is attached to the pedestal 30. In at least one embodiment, the centering pad 710 is positioned after the cover 40 is twisted and locked into place. The centering pad 710 may be secured via a press fit arrangement, fasteners, magnets, adhesives, or the like. For instance, the centering pad 710 may include h flanges 750, where h is a number, such as 1, 2, 3, 4, 5, etc. flanges. The flanges 750 may extend from the second side 740. The flanges 750 may be pressed into place, such as in one or more seams or grooves 730, 732, 734, or 736 (as best indicated in FIG. 8). In an example, the grooves 730, 732, 734, and 736 may be defined between the cover 40 and the pedestal 30. It is noted that the system 700 may include any number of grooves. Moreover, the grooves 730, 732, 734, and 736 may comprise the same or different sizes. It is further noted that the number for flanges 750, h, may be the same or different as the number of grooves.

The grooves 730, 732, 734, and 736 and the flanges 750 may be sized and shaped such that the flanges 750 are press fit into one or more of the grooves 730, 732, 734, and 736. This may hold the centering pad 710 in place. In another aspect, the flanges 750 may generally prevent the cover 40 from being rotated and may absorb or dampen vibrations to reduce noise and/or motion. In an example, the grooves 750 may be compressible and may bias the cover 40 in a locked position. The centering pad 710 may include a front portion or foot 754. The foot 754 may be sized and shaped to cover at least a portion of the front flange 744.

Figure 15:
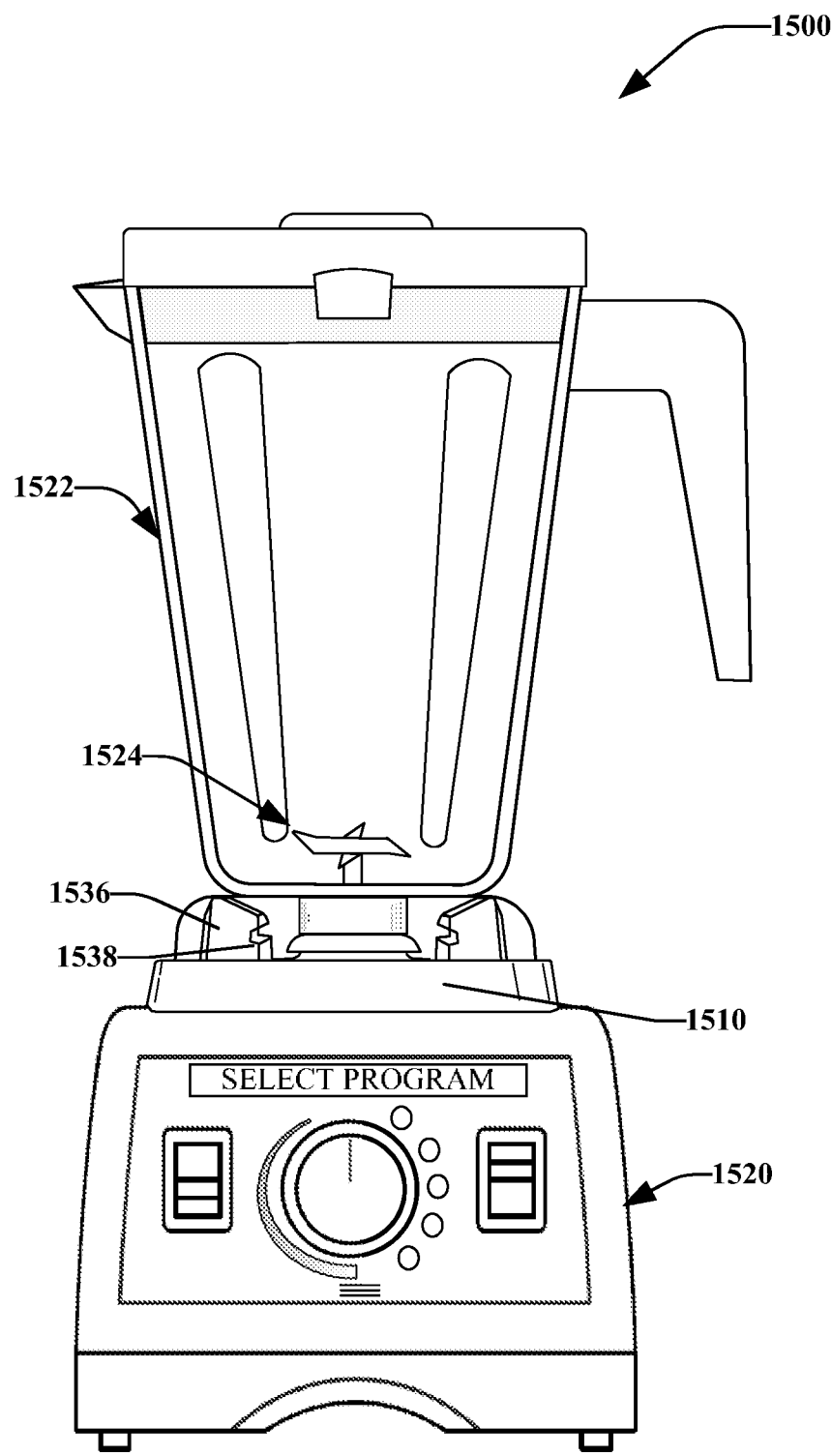
FIG. 15 is a front view of a blending system with a locking centering pad in accordance with various disclosed embodiments.
Figure 16:
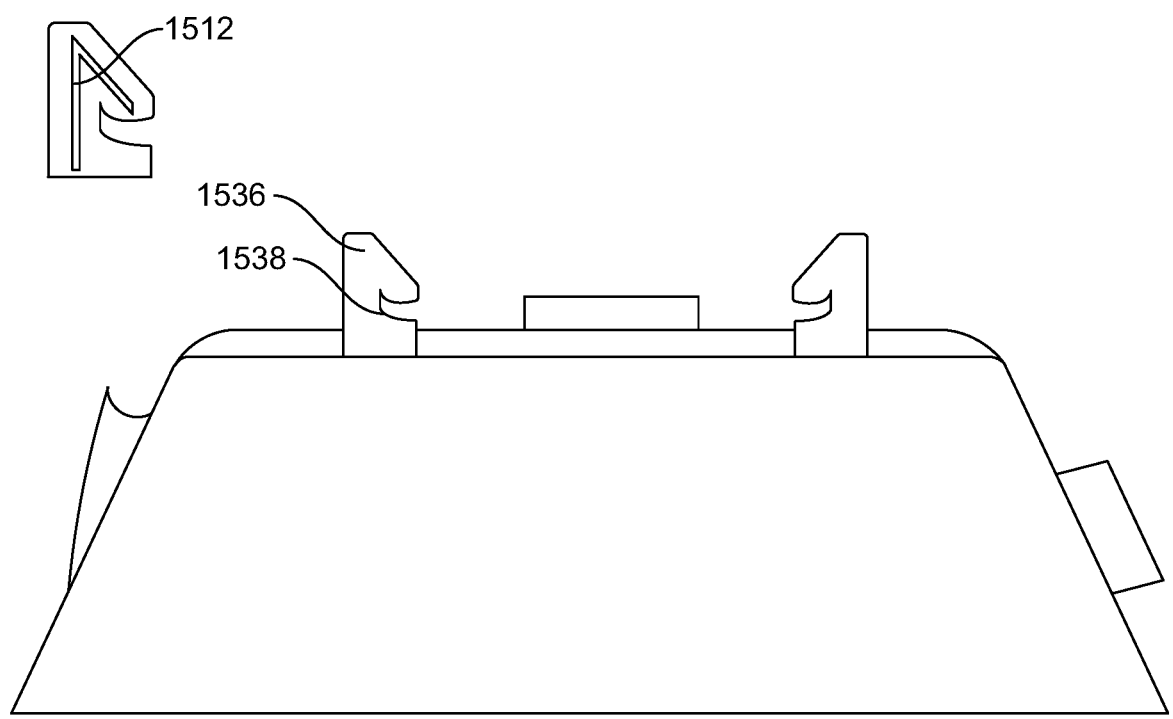
FIG. 16 is a side view of the blending system of FIG. 15 in accordance with various disclosed embodiments.
Figure 17:
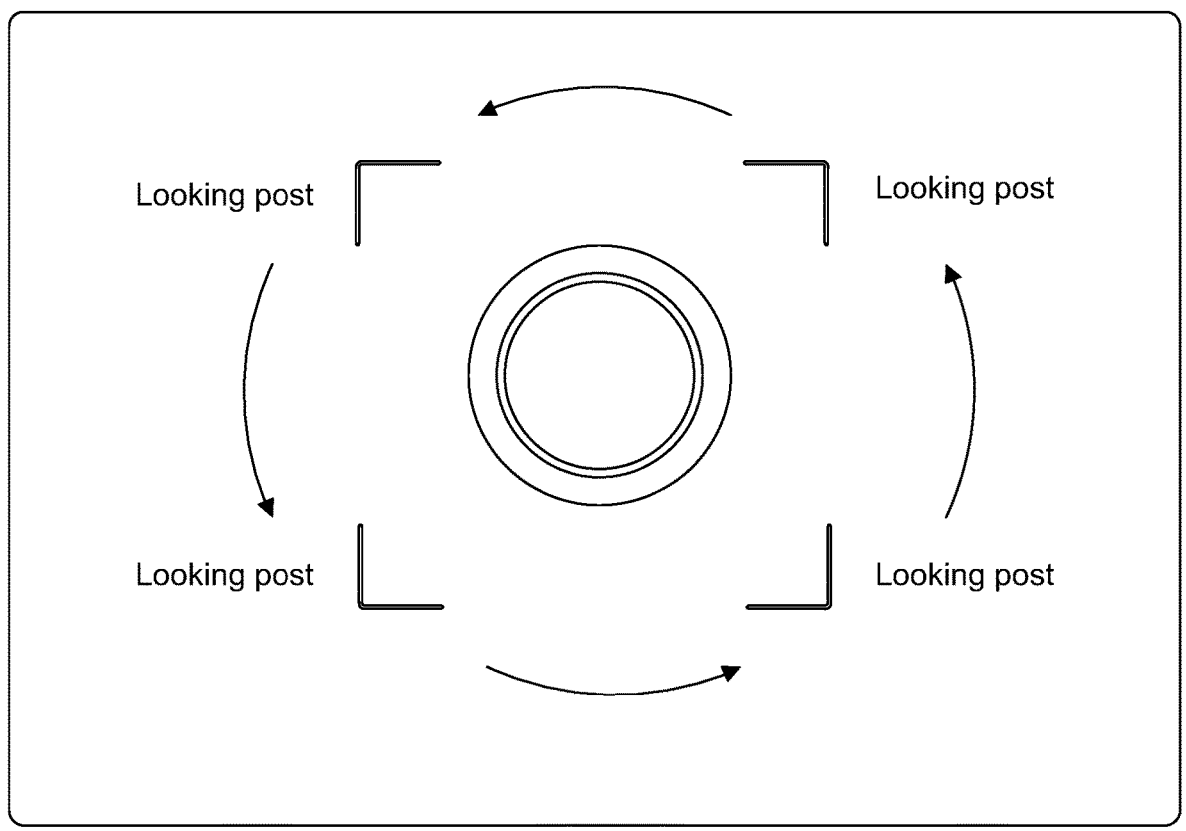
FIG. 17 is a top view of the blending system of FIG. 15 in accordance with various disclosed embodiments.

Turning to FIGS. 15-17, there depicted is a blender system 1500 operatively comprising a centering pad 1510, a blender base 1520, and a container 1522, and a blade assembly 1524. It is noted that the blender system 1500 may include interchangeable containers 1522 that may comprise a large format container as shown, single serving containers, food processor bowls, or the like. In an example, the large format containers may be held in place during operation by protrusions or projections 1536. The projections 1536 may be utilized to secure other types of containers in different manners.

In an example, the centering pad 1510 may include projections 1536 that may include locking members 1538. The locking members 1538 may comprise male or female locking members, grooves, pegs, or the like. In an example, the locking members 1538 may allow a user to place a food processor bowl on the centering pad 1510 and secure the bowl by twisting the bowl into place. In an aspect, the user may twist the bowl for a quarter turn in any direction to lock the bowl into place, such as shown in FIG. 17. The user may then twist the bowl again when done to unlock the bowl. It is noted that the locking members 1538 or other portions of the system 1500 may include sensors that may determine whether the bowl is locked into place. For instance, the locking members 1538 may include proximity sensors, pressure sensors, reed switches, or the like. The blender base 1520 may communicate with the sensors to determine whether one or more of the locking members 1538 are engaged or disengaged with the bowl.

In an aspect, the centering pad 1510 may be put on or taken off by a user. The centering pad 1510 may be retrofitted onto existing blender bases 1520 or may be installed on a blender base 1520 while in a factory. In various aspects, the centering pad 1510 may comprise a food grade elastomeric material, such as silicone or other rubber material. In at least some embodiments, the centering pad 1510 may comprise an insert 1512 disposed within the projections 1536. The insert 1512 may comprise a metal, plastic, or other material that may strengthen the projections 1536. In some embodiments, the insert 1512 may act as a clip to assist in securing the bowl to the blender base 1520.

FIG. 5 illustrates an exemplary blending system 500 in accordance with various disclosed embodiments. System 500 may utilize various disclosed aspects. For instance, system 500 may include an enclosure 40 as described with reference to FIGS. 1-4.

System 500 primarily includes a blender base 502, a container 520 operatively attachable to the blender base 502, a blade assembly 530 (which may include a bifurcated seal), and a lid 540 that may be operatively attached to the container. The container 520 may include walls 524 and a handle 522. Foodstuff may be added to the container 520 for blending. It is noted that the container 520 may comprise various materials such as plastics, glass, metals, or the like. In another aspect, container 520 may be powered in any appropriate manner.

The blade assembly 530, container 520, and base 502 may removably or irremovably attached. The container 520 may be powered in any appropriate manner, such as disclosed in U.S. patent application Ser. No. 14/213,557, entitled Powered Blending Container, which is hereby incorporated by reference. While shown as a large-format system, system 500 may comprise a single serving style system, where the container is filled, a blender base is attached to the container, and then the container is inverted and placed on a base.

The base 502 includes a motor disposed within a housing. The motor selectively drives the blade assembly 530 (e.g., cutting blades, chopping blades, whipping blades, spiralizing blades, etc.). The blade assembly 530 may agitate, impart heat, or otherwise interact with contents within the container. Operation of the blender system 500 may impart heat into the contents within container 520.

In at least one embodiment, the blending system 500 may identify or detect whether the system 500 is interlocked through mechanical detection (e.g., push rods), user input, image recognition, magnetic detection (e.g., reed switches), electronic detection (e.g., inductive coils, a near field communication (NFC) component), or the like. Further, the system 500 may identify or detect whether the enclosure 40 is interlocked to the pedestal 30 through mechanical detection (e.g., push rods), user input, image recognition, magnetic detection (e.g., reed switches), electronic detection (e.g., inductive coils, a near field communication (NFC) component), or the like System 500 and processes described herein generally relate to blending or food-processing systems that include a food-processing disc comprising one or more inductive coils. In another aspect, one or more of the disc and/or lid may comprise an NFC component that may interact with an NFC component of a blender base. The NFC component of the blender base may receive information regarding the type of the disc and may utilize the information to determine a blending process to be utilized by the system.

It is noted that the various embodiments described herein may include other components and/or functionality. It is further noted that while described embodiments refer to a blender or a blender system, various other systems may be utilized in view of the described embodiments. For example, embodiments may be utilized in food processor systems, mixing systems, hand-held blender systems, various other food preparation systems, and the like. As such, references to a blender, blender system, and the like, are understood to include food processor systems, and other mixing systems. Such systems generally include a blender base that may include a motor, a blade assembly, and a controller. Further, such systems may include a container, a display, a memory or a processor.

As used herein, the phrases "blending process," "blending program," and the like are used interchangeably unless context suggests otherwise or warrants a particular distinction among such terms. A blending process may comprise a series or sequence of blender settings and operations to be carried out by the system 500. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

Further details on certain aspects may be found in U.S. Pat. No. RE45,655, filed on May 14, 2013 and granted on Aug. 18, 2015, and/or U.S. patent application Ser. No. 14/659,094, filed on Mar. 16, 2015. Also, although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof

What is claimed is:

1. A blender assembly, comprising:
a base unit, the base unit housing a motor;
a pedestal extending from the base unit and defining a peripheral edge, wherein the peripheral edge includes a plurality of engagement members extending from the peripheral edge;
a container operatively positioned on the pedestal, the container comprising a blade assembly;
an enclosure providing a sound barrier and operatively attachable to said base unit, the enclosure comprising:
a body portion including sidewalls and a base portion that define a cavity, wherein the base portion includes an inner peripheral edge comprising a plurality of engagement channels, and wherein the container is configured to be operatively positioned within the cavity; and
a centering pad removably supported on the pedestal, the centering pad comprising:
one or more projections including a locking member that releasably interlocks with a corresponding member of the container via a twisting motion, the one or more projections formed of a first material; and
one or more inserts formed of a second material different from the first material, each one of the one or more inserts disposed within a corresponding one of the one or more projections;
wherein the base portion is configured to engage the pedestal such that the inner peripheral edge of the base portion circumscribes the peripheral edge of the pedestal, and wherein the enclosure is rotatable relative an axis defined by the pedestal between a locked and unlocked position to selectively secure the enclosure to the pedestal, wherein the plurality of engagement members are received by the plurality of engagement channels.

2. The blender assembly of claim 1, wherein the centering pad is formed from an elastomeric material.

3. The blender assembly of claim 1, wherein the one or more inserts are shaped to clip the container in a secured position.

4. A blender system, comprising:
a blender base;
a pedestal extending from the blender base;
a container removably supported on the pedestal, the container comprising a twisting lock member on an outer surface thereof; and
an elastomeric centering pad removably supported on the pedestal, the centering pad comprising one or more projections that include a locking member that releasably interlocks with twisting lock member of the container via a twisting motion,
wherein the centering pad further comprises one or more inserts, each one of the one or more inserts disposed within a corresponding one of the one or more projections, the one or more inserts providing a strengthening feature of the one or more projections and shaped to retain the container in a secured position.

5. The blender system of claim 4, wherein the container is an interchangeable container selected from one of a large format container, a single service container, or a food processor bowl.

6. The blender assembly of claim 4, wherein the locking member of each of the one or more projections is a hook shaped locking member.

7. The blender assembly of claim 4, wherein the locking member of each of the one or more projections is a male locking member and the corresponding member of the container is a female locking member.

8. The blender assembly of claim 4, wherein the locking member of each of the one or more projections is a female locking member and the corresponding member of the container is a male locking member.

9. The blender assembly of claim 4, wherein the locking member of each of the one or more projections releasably interlocks with the corresponding member of the container via a quarter turn twisting motion.

10. The blender assembly of claim 4, further comprising one or more sensors that sense whether the locking member of each of the one or more projections is engaged or disengaged with the corresponding member of the container.

11. The blender system of claim 4, wherein:
the pedestal comprises at least one groove; and
the centering pad comprises the one or more projections extending from a first surface thereof and at least one flange extending from a second surface thereof, the at least one flange releasably engagable with the at least one groove of the pedestal to secure the centering pad to the pedestal.

12. A blender assembly, comprising:
a blender base; and
a centering pad removably supported on the blender base, the centering pad comprising:
one or more projections including a locking member that releasably interlocks with a corresponding member of a container via a twisting motion, wherein the centering pad is formed from an elastomeric material,
wherein the centering pad further comprises one or more inserts, each one of the one or more inserts disposed within a corresponding one of the one or more projections, the one or more inserts providing a strengthening feature of the one or more projections and shaped to retain the container in a secured position.

13. The blender assembly of claim 12, wherein the locking member of each of the one or more projections is a hook shaped locking member.

14. The blender assembly of claim 12, wherein the locking member of each of the one or more projections is a male locking member and the corresponding member of the container is a female locking member.

15. The blender assembly of claim 12, wherein the locking member of each of the one or more projections is a female locking member and the corresponding member of the container is a male locking member.

16. The blender assembly of claim 12, wherein the locking member of each of the one or more projections releasably interlocks with the corresponding member of the container via a quarter turn twisting motion.

17. The blender assembly of claim 12, further comprising one or more sensors that sense whether the locking member of each of the one or more projections is engaged or disengaged with the corresponding member of the container.

18. The blender assembly of claim 12, further comprising:
a pedestal extending from the blender base, the pedestal comprising at least one groove,
wherein the centering pad comprises the one or more projections extending from a first surface thereof and at least one flange extending from a second surface thereof, the at least one flange releasably engagable with the at least one groove of the pedestal to secure the centering pad to the pedestal.

* * * * *